United States Patent

[11] 3,609,364

[72] Inventors T. O. Paine
Administrator of the National Aeronautics and Space Administration with respect to an invention of;
Robert L. Proffit, Chatsworth, Calif.
[21] Appl. No. 7,868
[22] Filed Feb. 2, 1970
[45] Patented Sept. 28, 1971

[54] HYDROGEN FIRE DETECTION SYSTEM WITH LOGIC CIRCUIT TO ANALYZE THE SPECTRUM OF TEMPORAL VARIATIONS OF THE OPTICAL SPECTRUM
5 Claims, 1 Drawing Fig.
[52] U.S. Cl. .................................................. 250/83.3 UV, 250/209, 340/228.2
[51] Int. Cl. .................................................. G08b 17/12, G01t 1/16, H01j 39/12
[50] Field of Search ........................................... 250/83.3 UV, 217 F, 208, 209; 340/228.2

[56] References Cited
UNITED STATES PATENTS
3,327,119  6/1967  Kamentsky .................. 250/83.3 UV

*Primary Examiner*—James W. Lawrence
*Assistant Examiner*—T. N. Grigsby
*Attorneys*—L. D. Wofford, Jr., G. J. Porter and G. T. McCoy

ABSTRACT: A hydrogen fire detector for use on a high altitude rocket. A hydrogen fire is detected by the ultraviolet radiation of the hot oxygen-hydrogen radical produced by hydrogen combustion, while the device selectively filters out ultraviolet radiation from other sources. The detection system senses both temporal variation and steady state radiation. Discrimination against engine exhaust plume radiation is accomplished by monitoring temporal variation. Solar discrimination is accomplished by a two-color technique whereby radiation is detected by two photomultiplier tubes, one filtered to accept visible radiation and the other filtered to accept ultraviolet radiation. The photomultiplier tubes control input to logic that produces an output signal only when a hydrogen fire is viewed.

PATENTED SEP 28 1971
3,609,364
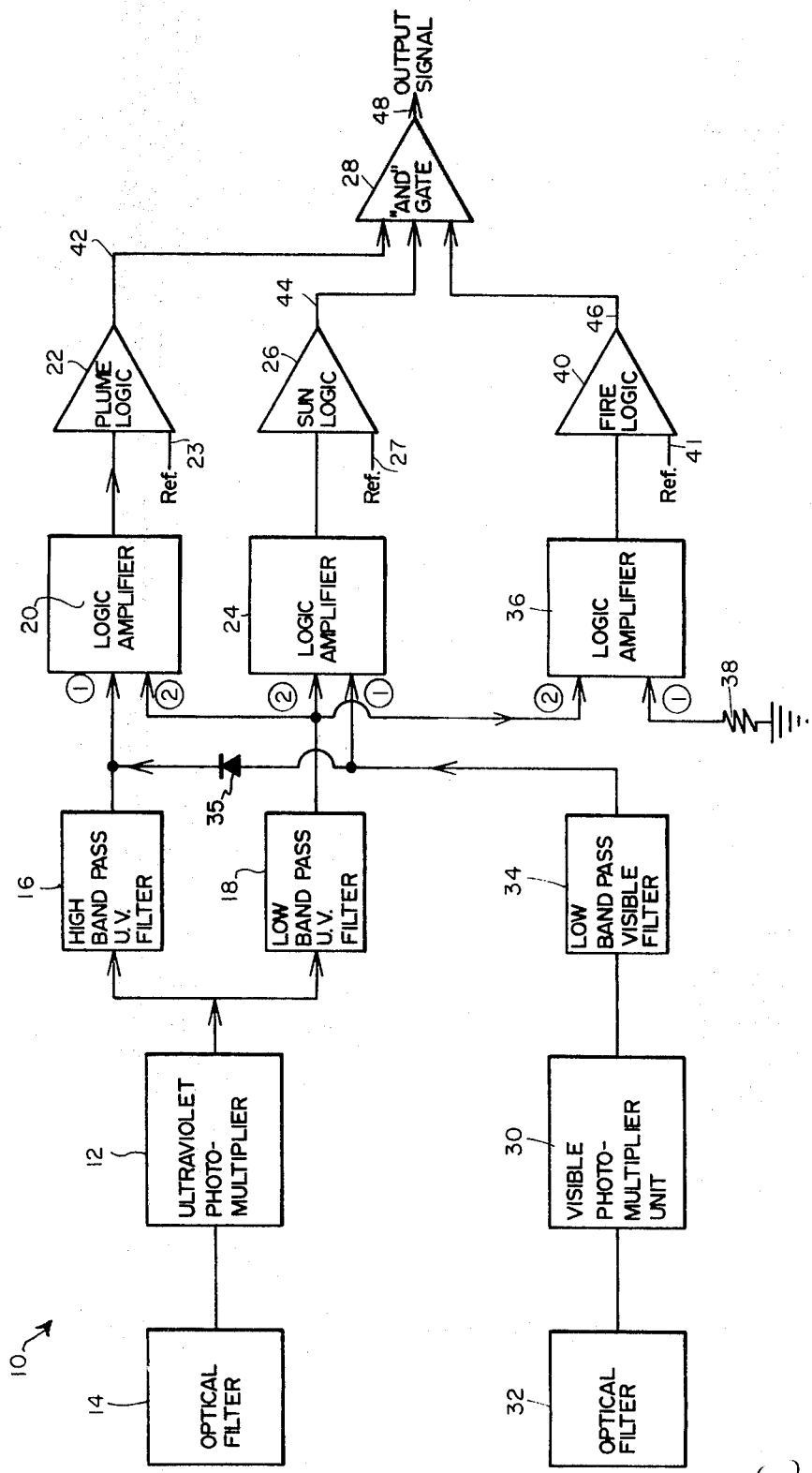
ROBERT L. PROFFIT
*INVENTOR*
BY
George J. Porter
*ATTORNEYS*

3,609,364

HYDROGEN FIRE DETECTION SYSTEM WITH LOGIC CIRCUIT TO ANALYZE THE SPECTRUM OF TEMPORAL VARIATIONS OF THE OPTICAL SPECTRUM

ORIGIN OF THE INVENTION

The invention described herein was made in the performance of work under a NASA contract and is subject to the provisions of Section 305 of the National Aeronautics and Space Act of 1958, Public Law 85-568 (72 Stat 435; 42 USC 2457).

BACKGROUND OF THE INVENTION

1. Field of the Invention

This invention relates to a fire detection device and particularly to a device for detection of hydrogen fires on board a high altitude rocket.

2. Description of the Prior Art.

The properties of hydrogen fires and explosions have become increasingly important with the use of liquid hydrogen as a rocket engine propellant. Considerable effort has been expended to determine certain important characteristics (e.g., quenching diameter, ignition energy and flammability limits) of hydrogen fires for purposes of developing detection and suppression techniques. Some of these characteristics vary considerably with pressure variations ranging between 0.1 and 1.0 atmospheres.

In the past a number of hydrogen fire detection systems based on the radiation emitted from the fire have been developed. Hydrogen fires radiate almost exclusively in the infrared and ultraviolet portions of the spectrum with essentially no radiation in the visible spectrum. Early investigations and detection systems were primarily concerned with the infrared radiation from such fires and used the temperature rise of a thermal detector to produce an electrical signal.

Other systems utilized the effect of infrared radiation on quantum detectors to obtain electrical changes by direct photon absorption without a temperature rise (e.g., photoelectric emission tubes and photoconductors, such as lead sulfide). Aircraft and missile fire detection systems based on infrared radiation were largely abandoned several years ago because of their high susceptibility to false fire indications from sunlight, hot metal and engine exhaust.

Ultraviolet radiation from hydrogen fires has been detected by Geiger-Mueller-type tubes and with several electric devices employing pure metal or semiconductor photocathodes with auxiliary optical filters and associated electronics. The principal objective in the development of these devices has been the acquisition of high ultraviolet sensitivity along with the rejection of background radiation longer than 3,000 Angstrom units in efforts to avoid false alarm due to sunlight. These so-called "solar blind" hydrogen fire detection devices, while superior to the infrared systems in sunlight below the atmospheric ozone layer and in the presence of hot objects, lack the degree of ultraviolet discrimination needed in modern rocket vehicle applications at altitudes above the ozone layer and in the presence of rocket engine plume radiation.

During the development of this invention, the initially conceived hydrogen fire detection system was based solely on the temporal variation in the radiation from hydrogen fires, solar background and rocket engine plumes. Thus, considerable effort was expended in determining the characteristics of this temporal variation and developing an AC system which would effectively detect hydrogen fires and discriminate fires from backgrounds. However, experiments on hydrogen flames burning at simulated altitudes revealed that the temporal variation in the ultraviolet radiation experiences a drastic reduction in amplitude as the pressure decreased below 200 torr. (A torr is defined as a unit of atmospheric pressure equivalent to 1 mm. of mercury or one seven hundred-sixtieth of a standard atmosphere.) Therefore a system solely dependent upon the temporal variation was abandoned and one which also relies upon the ultraviolet steady state radiation from the hydrogen fire appeared to require investigation.

SUMMARY OF THE INVENTION

Accordingly, it is an object of this invention to develop a hydrogen fire detector unit which can discriminate against both solar radiation and rocket engine plume radiation.

It is a further object of the invention to develop a hydrogen fire detector which relies on the ultraviolet steady state radiation as well as on temporal radiation.

These and other objects are accomplished in the present invention which includes two photomultiplier tubes connected to logic which discriminates against both sunlight and hydrogen-oxygen exhaust plume radiation and produces an output signal only when a diffuse hydrogen fire if viewed.

BRIEF DESCRIPTION OF THE DRAWINGS

FIG. 1 is an illustrative block diagram of the invention.

DESCRIPTION OF THE PREFERRED EMBODIMENT

With continued reference to the accompanying FIGURE, reference numeral 10 generally designates an illustrative embodiment of the device used to detect fires, particularly hydrogen fires, on a high altitude rocket.

The device includes an ultraviolet photomultiplier unit 12 equipped with an optical filter 14. Photomultiplier unit 12 is filtered to accept only ultraviolet radiation having a wavelength of 3,100 A. This ultraviolet radiation includes radiation emitted from a hydrogen fire, the rocket engine plume, or sunlight above the earth's ozone layer. Connected to photomultiplier 12 is a high band-pass ultraviolet filter 16, which is an active filter to selectively pass ultraviolet signals with high-frequency intensity variations in the range of 300 to 950 Hz. This range includes rocket engine plume ultraviolet radiation and other radiation from premixed, force-fed fires.

Also connected to photomultiplier unit 12 is a low band-pass ultraviolet filter 18, which is an active filter to selectively pass ultraviolet signals with low-frequency intensity variations in the range of DC to 110 Hz. This range includes ultraviolet radiation from the rocket engine plume, diffuse hydrogen fires, and sunlight above the ozone layer.

Filter 16 is connected to logic amplifier 20 which is connected to plume logic amplifier 22, having reference voltage input 23. Filter 18 is connected to logic amplifier 24, which is connected to sun logic amplifier 26, having reference voltage input 27. Both amplifiers 22 and 26 are connected to AND gate 28.

Hydrogen fire detector 10 also includes photomultiplier unit 30 having optical filter 32. Photomultiplier unit 30 is filtered to accept only visible radiation having a wavelength of 4,500 A. from the sun. Photomultiplier unit 30 is connected to low band-pass visible filter 34, which is an active filter to selectively pass the visible light signals with low-frequency intensity variations in the range of DC to 110 Hz. Thus, this filter passes sunlight. It discriminates against hydrogen fires, which usually do not emit any appreciable amount of visible light, unless the hydrogen contains impurities. Filter 34 is connected directly to logic amplifiers 20 and 24. A diode 35 is inserted in the input line to logic amplifier 20 from filter 34 to prevent the high-frequency ultraviolet signal from filter 16 from reaching the input to logic amplifier 24.

The output of low band-pass ultraviolet filter 18 is connected directly to logic amplifiers 20, 24 and 36. Logic amplifier 36 is grounded through resistor 38 to provide a reference voltage input. Logic amplifier 36 is also connected to fire logic amplifier 40 having a reference voltage input 41.

Logic amplifiers 20, 24 and 36 are all summing amplifiers which provide outputs dependent upon the difference between their two inputs. The outputs 42, 44 and 46 respectively of amplifiers 22, 26 and 40 have a value of −3 volts only when their input voltage is greater than a set reference voltage; otherwise these outputs have a value of −11 volts. Amplifier 40, as well as amplifiers 22 and 26, are all connected to AND gate 28, which will provide an output signal 48 only when its three input signals are all −3 volts.

For engine plume logic amplifier 20, input 1 is Euvhf + Evis, e.g., the sum of the high-frequency ultraviolet plume radiation and the visible radiation from the sun. Input 2 to amplifier 20 is Euvs + Euvp + Euvf, e.g., the sum of the low-frequency ultraviolet radiation from the sun, engine plume, and fire, respectively.

For sun logic amplifier 24, input 1 is Evis, the visible component of radiation from the sun. Input 2 is Euvs + Euvp + Euvf, e.g., the sum of the low-frequency ultraviolet radiation from the sun, engine plume, and fire respectively.

For fire logic amplifier 36, input 1 is a fixed reference signal. Input 2 is Euvs + Euvp + Euvf, e.g., the sum of the low-frequency ultraviolet radiation from the sun, engine plume, and fire, respectively.

Therefore, the output equations for logic amplifiers 20, 24 and 36 are as follows:

Amplifier 20 output = Euvs + Euvp + Euvf − Euvhf − Evis
Amplifier 24 output = Euvs + Euvp + Euvf − Evis
Amplifier 36 output = Euvs + Euvp + Euvf The following table illustrates how AND gate 48 combines the outputs 42, 44 and 46, respectively, of the plume logic amplifier 22, the sun logic amplifier 26, and the fire logic amplifier 40, under various conditions, to indicate a fire only when a diffuse fire exists, either with or without other conditions:

OUTPUT TABLE

| Condition | 42 | 44 | 46 | Fire Indication |
| --- | --- | --- | --- | --- |
| Dark | −11 | −11 | −11 | No |
| Sun | −11 | −11 | − 3 | No |
| Plume | −11 | − 3 | − 3 | No |
| Sun-Plume | −11 | − 3 | − 3 | No |
| Sun-fire | − 3 | − 3 | − 3 | Yes |
| Sun-Plume-Fire | − 3 | − 3 | − 3 | Yes |
| Plume-Fire | − 3 | − 3 | − 3 | Yes |
| Fire | − 3 | − 3 | − 3 | Yes |

As will be understood by one skilled in the art, the filters in the above-described device must be adjusted initially so that the ultraviolet output from the sun is equal to the visible output from the sun.

The foregoing discussion described a hydrogen fire detection system which will detect diffuse hydrogen fires at high altitudes in the presence of sunlight and oxygen-hydrogen engine exhaust plume radiation. The two-color discrimation (4,500 A. and 3,100 A.) controls input to logic that produces an output signal only when a hydrogen fire is viewed. The system senses both temporal variation and steady state radiation. The system takes advantage of the difference in the frequency intensity variations so that it distinguishes between a premixed force-fed hydrogen fire, e.g., an engine exhaust plume, and an accidental (diffuse) hydrogen fire.

Although the illustrative embodiment described herein is a fire detection system for a high-altitude rocket, the system may also be used as a remote or automated hydrogen fire control system for large processing installations, where free hydrogen is either a reactant or an effluent. Small hydrogen fires from leaks or vents can jeopardize a large installation unless quickly isolated and controlled.

What is claimed is:

1. A hydrogen fire detection system comprising:
   a. photomultiplier means, said means being filtered to accept light of a plurality of different, predetermined wavelengths;
   b. filter means connected to said photomultiplier means to selectively pass intensity variations of predetermined frequency;
   c. logic means connected to said filter means for producing an output only when a diffuse hydrogen fire is viewed, said logic means comprising:
      1. means for summing a plurality of voltage inputs from said filter means, each said input representing a separate radiation source, and producing a plurality of output sums;
      2. comparison means connected to said summing means for comparing each said sum with a different presettable reference voltage and producing an output corresponding to each said sum, each said output being a first fixed voltage if said sum exceeds its corresponding said reference voltage and being a second fixed voltage if said sum is less than its corresponding said reference voltage; and
      3. an AND gate connected to said comparison means for receiving said outputs from said comparison means, said AND gate being adjusted to produce a fire output signal only when all of said outputs of said logic means equal said first fixed voltage.

2. The hydrogen fire detection system of claim 1 wherein said photomultiplier means comprises two photomultiplier units, one of said units being filtered to accept ultraviolet light and the other unit being filtered to accept visible light.

3. The hydrogen fire detection system of claim 2 wherein said filter means comprise:
   a. a high band-pass ultraviolet filter capable of passing high-frequency ultraviolet radiation, said high band-pass filter being directly connected to said ultraviolet photomultiplier unit;
   b. a low band-pass ultraviolet filter capable of passing low-frequency ultraviolet radiation, said low band-pass filter being connected directly to said ultraviolet photomultiplier unit; and
   c. a low band-pass visible filter capable of passing low-frequency visible radiation, said low band-pass filter being connected directly to said visible photomultiplier unit.

4. The hydrogen fire detection system of claim 3 wherein said summing means comprises:
   a. a first logic amplifier having a first input connection to said high band-pass ultraviolet filter and said low band-pass visible filter, for providing a first input signal comprising the sum of high-frequency ultraviolet radiation from a rocket engine plume and visible radiation from the sun, said first logic amplifier having a second input connection to said low band-pass ultraviolet filter for providing a second input signal comprising the sum of low-frequency ultraviolet radiation from a diffuse hydrogen fire, a rocket engine plume, and the sun, said first logic amplifier summing said first and second input signals to produce an output signal;
   b. a second logic amplifier having a first input connection to said low band-pass visible filter for providing a first input signal comprising visible radiation from the sun, said first input connection of said second logic amplifier being a tap to said first input connection to said low band-pass visible filter of said first logic amplifier, said second logic amplifier having a second input connection to said low band-pass ultraviolet filter for providing a second input signal comprising the sum of low-frequency ultraviolet radiation from a diffuse hydrogen fire, a rocket engine plume, and the sun, said second logic amplifier summing said first and second input signals to produce an output signal;
   c. a third logic amplifier having a first input connection for providing a fixed reference signal, said third logic amplifier having a second input connection to said low band-pass ultraviolet filter for providing a second input signal comprising the sum of low-frequency ultraviolet radiation from a diffuse hydrogen fire, a rocket engine plume, and the sun, said third logic amplifier summing said first and second input signals to produce an output signal;
   d. a diode in said first input connection of said first logic amplifier to said low band-pass visible filter, between said first input connection to said first logic amplifier and said tapped first input connection to said second logic amplifier, for preventing the signal from said high band-pass ultraviolet filter from reaching said tapped first input connection to said second logic amplifier.

5. The hydrogen fire detection system of claim 4 wherein said comparison means comprises:
   a. a plume logic comparison amplifier connected to said first logic amplifier;
   b. a sun logic comparison amplifier connected to said second logic amplifier;
   c. a fire logic comparison amplifier connected to said third logic amplifier;
   d. each of said comparison amplifiers having a presettable reference voltage input, each said comparison amplifier being adjusted so as to compare said output sum from its own said logic amplifier with its own presettable reference voltage input, for producing an output of a first fixed voltage when said output sum exceeds said reference voltage input and a second fixed voltage when said output sum is less than said reference voltage input.